United States Patent
Ochiai et al.

(10) Patent No.: US 6,428,698 B1
(45) Date of Patent: *Aug. 6, 2002

(54) COAGULATION PRECIPITATOR

(75) Inventors: Hisaaki Ochiai; Tomoaki Miyanoshita, both of Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/367,491

(22) PCT Filed: Dec. 25, 1998

(86) PCT No.: PCT/JP98/05901

§ 371 (c)(1),
(2), (4) Date: Aug. 17, 1999

(87) PCT Pub. No.: WO99/33541

PCT Pub. Date: Jul. 8, 1999

(30) Foreign Application Priority Data

Dec. 26, 1997 (JP) ................................ 9-360291

(51) Int. Cl.⁷ .................................................. C02F 9/00
(52) U.S. Cl. ...................... 210/202; 210/262; 210/265; 210/284
(58) Field of Search .................. 210/202, 284, 210/DIG. 5, 253, 259, 262, 265, 314, 317

(56) References Cited

U.S. PATENT DOCUMENTS

| | | | | |
|---|---|---|---|---|
| 4,059,511 A | * | 11/1977 | Musha et al. | 210/DIG. 5 |
| 4,191,651 A | * | 3/1980 | Cheysson et al. | 210/DIG. 5 |
| 5,518,610 A | * | 5/1996 | Pierpoline | 210/DIG. 5 |
| 6,290,842 B1 | * | 9/2001 | Miyanoshita et al. | 210/97 |

FOREIGN PATENT DOCUMENTS

| | | |
|---|---|---|
| JP | 44-20029 | 8/1969 |
| JP | 57-50513 | 3/1982 |
| JP | 1-163416 | 11/1989 |
| JP | 6-304411 | 11/1994 |

* cited by examiner

Primary Examiner—Ivars Cintins
(74) Attorney, Agent, or Firm—Fish & Richardson P.C.

(57) ABSTRACT

A coagulator for receiving water bearing suspended solids and a coagulant and for coagulating the suspended solids includes a coagulation and sedimentation part and an upstream coagulation part. The coagulation and sedimentation part includes a second packing medium accumulation layer with accumulated packing media having a void volume, and a sludge accumulation zone positioned below the second packing medium accumulation layer and configured to receive solids that coagulate from the water and also having a sludge removal opening by which the received coagulated solids may be discharged. The water bearing the coagulant is allowed to flow upward through the second packing medium accumulation layer to coagulate and settle the suspended solids from the water in the sludge accumulation zone. The upstream coagulation part includes at least one first packing medium accumulation layer with packing media having a void volume, the upstream coagulation part being disposed between the second packing medium accumulation layer and the sludge accumulation zone of the coagulation and sedimentation part. The coagulator is configured to pass the water bearing the coagulant through the first packing medium accumulation layer prior to passing the water through the second packing medium accumulation.

25 Claims, 6 Drawing Sheets

MAIN PART OF COAGULATOR 70
IN EXEMPLARY EMBODIMENT 1

COAGULATION PRECIPITATOR

TECHNICAL FIELD

The present invention relates a coagulator, and more particularly it relates to a coagulator in which an inorganic coagulant such as an aluminum-based coagulant is added to raw water to coagulate and separate suspended solids in the raw water.

BACKGROUND ART

Coagulators are apparatuses used to treat water for use where water from a river or the like is treated so that it can be used as municipal or industrial water, and where waste water such as public sewage or factory waste water, is treated to meet regulatory limits. In particular, an upflow type coagulator is often employed because such a coagulator has high coagulating and filtering efficiencies and is easy to operate.

In an upflow coagulator, raw water to which a coagulant is added is passed upward through the interior of a packing medium accumulation layer formed by stacking small pieces of packing medium having a high void ratio to thereby flocculate and settle suspended solids in the water.

Figure 5:
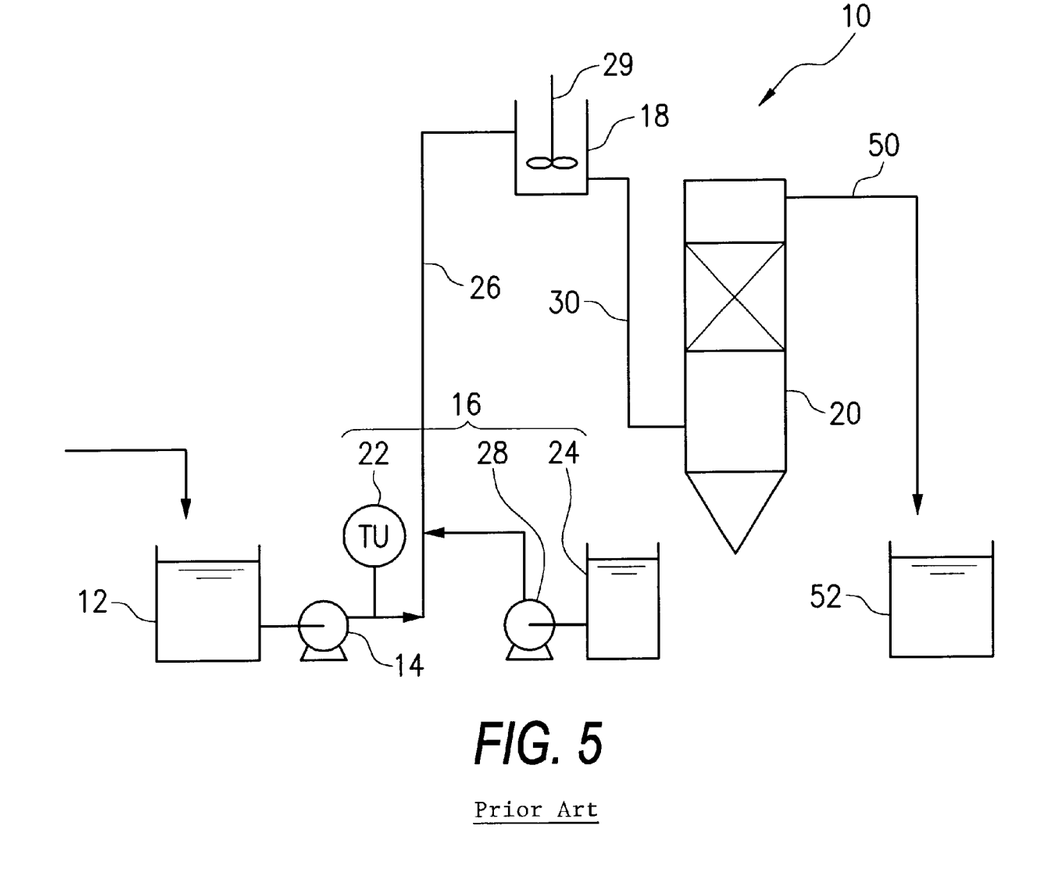
FIG. 5 is a flow sheet showing the constitution of a conventional coagulator.

Referring now to FIG. 5, description will be given of a configuration and an operation of a conventional upflow type coagulator 10.

This typical conventional upflow type coagulator 10 comprises, as shown in FIG. 5, a raw water tank 12, a raw water pump 14 for pumping raw water from the raw water tank 12 to feed the raw water, coagulant adding facilities 16, a coagulant mixing tank 18 and a coagulation tank 20.

The coagulant adding facilities 16 include a turbidimeter 22 for measuring the turbidity of the raw water, a coagulant tank 24, a coagulant pump 28 for injecting the coagulant from the coagulant tank 24 into a raw water supply pipe 26 on the downstream side of the turbidimeter 22 so that a desired amount of the coagulant may be added to the raw water on the basis of a measured value of the turbidimeter 22.

The coagulant mixing tank 18 is a container fitted with a stirrer 29, in which the raw water bearing the coagulant is temporarily stored and stirred by the stirrer 29 to rapidly mix the raw water and the coagulant. The water bearing the coagulant is then sent via an inflow pipe 30 to the coagulation tank 20.

Figure 6:
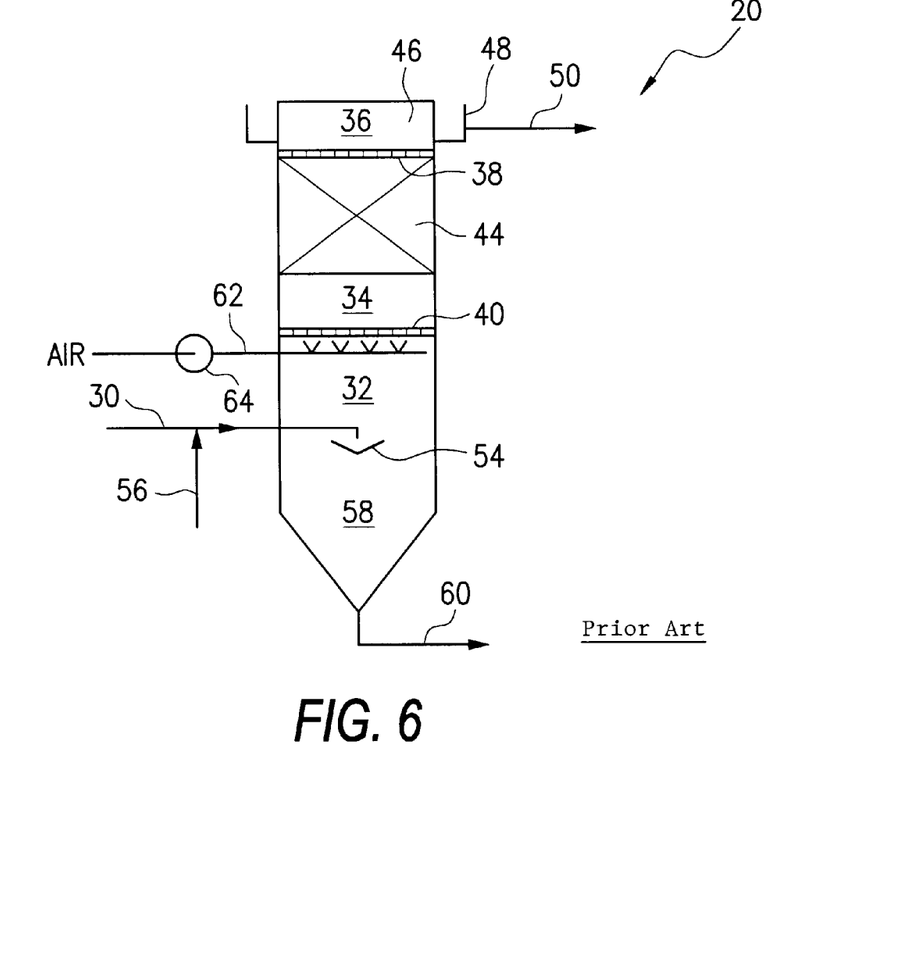
FIG. 6 is a schematic view showing the constitution of a coagulation tank installed in the conventional coagulator.

The coagulation tank 20 is a tank in which the suspended solids in the water which have been aggregated by the coagulant are coagulated, flocculated, filtered and separated. As shown in FIG. 6, the coagulation tank 20 consists of a water inflow zone 32, a packing medium accumulation zone 34, and a water collection zone 36 which are partitioned in sequence from the underside.

Figure 7:
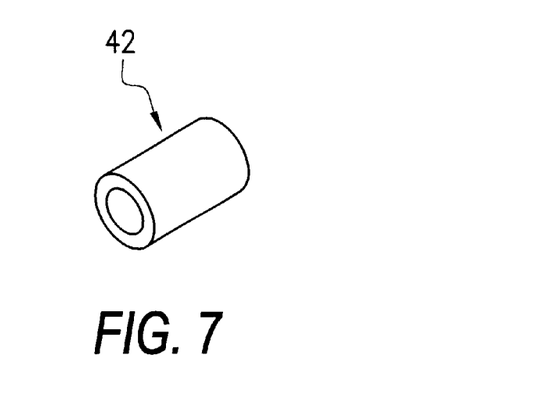
FIG. 7 is a perspective view showing one example of a packing medium.

The packing medium accumulation zone 34 is partitioned by perforated outflow prevention plates 38, 40 which are provided in an upper part and a lower part of the zone. In this packing medium accumulation zone 34, many small packing media having a small specific gravity and a high void ratio are accommodated, and a packing medium accumulation layer 44 is formed below the upper outflow prevention plate 38 with the upflow of the water. As the small packing media for forming the packing medium accumulation layer 44, for example, there are employed short tube-shaped plastic small packing media 42 having a relatively small specific gravity as shown in FIG. 7.

The water collection zone 36 is a region for collecting the treated water which has been treated through the packing medium accumulation zone 34, and this zone 36 consists of a water collecting part 46 disposed immediately above the outflow prevention plate 38 of the packing medium accumulation zone 34, a water collection trough 48 for collecting the treated water overflowing from the upper end of the water collection part 46, and an outflow pipe 50, connected to the water collection trough 48, for sending the treated water to a treated water tank 52 (see FIG. 5).

The raw water leaving the coagulant mixing tank 18 flows via the inflow pipe 30 into the inflow zone 32. The inflow pipe 30 extends to the middle of the inflow zone 32, and has at its tip a downward opening. An inverted umbrella-shaped baffle plate 54 is provided under the opening of the inflow pipe 30 to change the direction of flow of the raw water from downward to upward. An alkaline agent injection pipe 56 is also connected to the inflow pipe 30 so as to inject an alkaline solution, if desired, for the control of the pH of the raw water.

In the lower part of the inflow zone 32, that is, below the baffle plate 54, there lies a hopper-shaped sludge storage zone 58 for storing the sludge, to the lowermost part of which is connected a sludge discharge pipe 60 for discharging the sludge.

Above the inflow zone 32 is disposed an air supply pipe 62 having a plurality of air nozzles for jetting air upward, so as to eject air fed by the air blower 64 to thereby stir and wash the packing media 42 of the packing medium accumulation zone 34.

In the coagulation tank 20, the water bearing the coagulant first flows into the inflow zone 32. In this inflow zone 32, among flocs formed as a result of coagulation of the suspended solids in the raw water, relatively large flocs are first settled and separated.

The water then flows into the packing medium accumulation zone 34, in which micro-flocs remaining in the water come into contact with the packing media and adhere onto the external surfaces of the packing media, or are captured in the interstices between the respective packing media 42 and are separated. Water flows upwardly through voids of the packing media 42 or flows through between the respective packing media, and is filtered through the floc layer formed in the voids or between the packing media, while simultaneously the micro-flocs in the raw water are captured by the floc layer.

Flocs which have adhered onto the packing media 42 or have been captured between the packing media 42 gradually grow due to contact with the subsequent micro-flocs or the like, resulting in flocs of increased diameter. Then, accordingly as the flocs having a higher settlement velocity than the upward flow rate of the raw water become formed, these flocs are dislodged from the packing media 42 by the flow of the water, settle against the flow of the water, retained in the sludge storage zone 58, and then discharged via the sludge discharge pipe 60.

In this manner, suspended solids in the raw water are separated from the water and settled in the sludge storage zone 58 by the agglomeration of the suspended solid flocs, the filtration of raw water through the layer of flocs, the separation and settlement of the agglomerated flocs, and the like. On the other hand, raw water thus treated flows out from the water collection zone 36 into the treated water tank 52.

When the packing medium accumulation layer 44 of the packing medium accumulation zone 34 clogs, air jets through the air nozzles of the air supply pipe 62 to stir and wash the packing medium accumulation layer 44.

This upflow type coagulator enables treatment to be performed at a high speed because the density of the coagulated flocs which have become thickly agglomerated is high as is settlement speed. Accordingly, the facilities become compact, so that facility installation area can be reduced, the amounts of chemical agents can be decreased, and the treatment and disposal of the generated sludge can be simplified.

While upflow type coagulators have many advantages, for the purpose of further heightening its treatment efficiency, various improvements have been made.

For example, it has been attempted to prolong water treatment time between the respective wash treatments by the use of packing media having a large size in place of the small packing media which constitute the packing medium accumulation layer, but this results in a problem that the turbidity of the treated water increases. Conversely, when the packing media having smaller sizes are used in order to decrease the turbidity of the treated water, the wash frequency of the packing medium accumulation layer increases, so that there arises a problem that the raw water treatment time is shortened.

Thus, an object of the present invention is to provide a coagulator which can decrease the frequency of the media wash operation while the turbidity of treated water is maintained at a low level.

SUMMARY OF THE INVENTION

A coagulator in accordance with the present invention has a first coagulation part. This first coagulation part possesses at least one packing medium accumulation layer through which raw water is passed at a superficial velocity higher than that of a packing medium accumulation layer in a subsequent coagulation and sedimentation part. Accordingly, primary treated water subjected to coagulation in the packing medium accumulation layer in the upstream coagulation part can be allowed to flow into the subsequent coagulation and sedimentation part.

The superficial velocity (a velocity obtained by dividing a water passage flow rate by a sectional area of the packing medium accumulation layer) in the packing medium accumulation layer in the first coagulation part should be higher than the superficial velocity (e.g., 150 to 800 m/day, preferably 300 to 500 m/day) in the packing medium accumulation layer in a downstream coagulation and sedimentation part. For example, the former velocity can be about twice that of the latter velocity.

Small packing media which constitute the packing medium accumulation layers of the upstream coagulation part and the downstream coagulation and sedimentation part have high void ratios. No particular restriction is put on the shape, material and kind of the small packing media, so long as they can be accumulated to form the packing medium accumulation layer, but these small packing media preferably should have voids which functions as water passages at a high void ratio of 60% or more and have such large surface areas that the surface area per m$^3$ of the accumulated packing media is 200 cm$^2$ or more, preferably 300 cm$^2$ or more.

For example, as the small packing media, there may be preferably used plastic tubes having a diameter of about 4 mm and a length of about 4 mm, hollow spheres having many holes on their surfaces, a Tellerette packing or the like, but they are not particularly restrictive.

The small packing media which constitute the packing medium accumulation layer of the upstream coagulation part may be similar, in shape and size, to the small packing media which constitute the packing medium accumulation layer of the downstream coagulation and sedimentation part. Alternatively, at least one of the shape and size of the small packing media which constitute the packing medium accumulation layer of the downstream coagulation part may be different from that of the small packing media which constitute the packing medium accumulation layer of the coagulation and sedimentation part.

Suitably, the small packing media which constitute the packing medium accumulation layer of the downstream coagulation and sedimentation part has the same shape as the small packing media which constitute the packing medium accumulation layer of the upstream coagulation part and has sizes smaller than that of the small packing media which constitute the packing medium accumulation layer of the upstream coagulation part.

With regard to the raw water which can be treated in the coagulator of the present invention, its source and quality are not limited, and for example, water having a turbidity of several degrees to 2000 degrees is applicable. In this specification, raw water refers to water which is introduced into the coagulator, and includes water such as river water, well water, lake water, and swamp water, as well as waste water which is introduced into the coagulator.

No restriction is imposed on the coagulant to be added to the raw water, as long as it has a coagulating effect for the suspended solids in the raw water. The coagulant may preferably be, for example, aluminum salts such as aluminum sulfate and polyaluminum chloride.

If a ratio of coagulated flocs having diameters more 100 $\mu$m in the raw water (added with the coagulant) which is passed through the packing medium accumulation layer increases, the viscosity of the flocs which adhere to the packing media and grow thereon increases, so that the separability of the flocs from the packing media and the dewaterability of collected sludge deteriorate inconveniently. Therefore, the ratio of the flocs having diameters more than 100 $\mu$m should better be as low as possible, and it is necessary to control the dosage level of the coagulant so that this ratio does not exceed 5% or so. The dosage level of the coagulant depends on its kind, the quality of the raw water and the like, and hence is previously set to a preferred value by means of experiments or the like.

In the case of using an aluminum based inorganic coagulant, its dosage level, which may vary depending on the turbidity of the raw water, may usually be in the range of 0.1 to 0.001, and preferably 0.05 to 0.005 in terms of an ALT ratio [aluminum (AL) dosage level/turbidity]. By employing the ALT ratio in this range, the suspended solids in the raw water are so coagulated as to form micro-flocs of the suspended solids having dimensions of 100 $\mu$m or less, preferably several $\mu$m to several tens $\mu$m.

When the upstream coagulation part is installed and when the superficial velocity in the packing medium accumulation layer of the upstream coagulation part is regulated to be higher than the superficial velocity in the packing medium accumulation layer of the downstream coagulation and sedimentation part, the micro-flocs introduced to the upstream coagulation part grow into the coarse flocs having large sizes and most of the coagulated coarse flocs are discharged from the packing medium accumulation layer without stagnating in the packing medium accumulation layer. In the downstream coagulation and sedimentation part, therefore, the thus discharged coagulated coarse flocs are allowed to settle as much as possible by weight and then removed, and the remaining micro-flocs alone are introduced into the packing medium accumulation layer of the downstream coagulation and sedimentation part and they grow into the coarse flocs therein to be captured by the packing medium accumulation layer.

That is to say, in the upstream coagulation part, the micro-flocs produced by the addition of the coagulant to the raw water can be coarsened, and the thus coarsened coagulated flocs are settled and separated early in the downstream coagulation and sedimentation part to reduce the amount of the flocs per unit amount of the raw water which flow into the packing medium accumulation layer of the downstream coagulation and sedimentation part, whereby the occurrence of the clogging of the packing medium accumulation layer in the downstream coagulation and sedimentation part can be decreased and hence a packing medium wash interval can be prolonged.

In particular, when the small packing media constituting the packing medium accumulation layer in the downstream coagulation and sedimentation part are formed so as to have the same shape as,the small packing media constituting the packing medium accumulation layer in the upstream coagulation part and so as to have smaller sizes than the small packing media constituting the packing medium accumulation layer in the upstream coagulation part, the turbidity of the treated water can be decreased. Furthermore, in the upstream coagulation part, the micro-flocs are coarsened, but the coarsened flocs are discharged as much as possible from the packing medium accumulation layer without stagnating in this layer. On the other hand, in the packing medium accumulation layer in the downstream coagulation and sedimentation part, the micro-flocs which have not been coarsened in the upstream coagulation part are securely captured. As described above, the sharing of functions is clarified so that the effect of the present invention can be improved.

Additionally, in the present invention, most micro-flocs grow into large size coagulated flocs in the upstream coagulation part, and, when these flow into the downstream coagulation and sedimentation part, they are settled and separated at an early stage. As a result, the amount of coagulated micro-flocs which flow into the packing medium accumulation layer in the downstream coagulation and sedimentation part decreases, thereby permitting the use of smaller packing media compared with conventional media, without shortening the medium wash interval of the packing medium accumulation layer in the downstream coagulation and sedimentation part.

The use of the smaller packing media in the downstream coagulation and sedimentation part enables the coagulated flocs to be densely held in the packing medium accumulation layer, and the contact chance of the coagulated flocs and the subsequent micro-flocs and the like can be increased to reduce the turbidity of the treated water.

The packing medium accumulation layer in the upstream coagulation part and the packing medium accumulation layer in the downstream coagulation and sedimentation part may be disposed in turn from bottom to top in one treatment tank so that the raw water and the primary treated water (raw water created in the upstream coagulation part) may flow upwardly. In this case, the two packing medium accumulation layers are partitioned by a perforated partition plate having such an opening that the small packing media constituting the packing medium accumulation layers may not be mixed with each other.

Furthermore, the packing medium accumulation layer in the upstream coagulation part and the packing medium accumulation layer in the downstream coagulation and sedimentation part may be disposed in parallel in one treatment tank so that the raw water may flow through the packing medium accumulation layer in the upstream coagulation part in the manner of an upward or downward flow and the primary treated water may flow through the packing medium accumulation layer in the downstream coagulation and sedimentation part in the manner of the upward flow.

In addition, the packing medium accumulation layer in the upstream coagulation part and the packing medium accumulation layer in the downstream coagulation and sedimentation part may be disposed in different treatment tanks, respectively, so that the raw water may flow through the packing medium accumulation layer in the upstream coagulation part in the manner of an upward or downward flow.

Suitably, there are disposed a turbidity detecting part for measuring the turbidity of the raw water, and a dosing control part in which the amount of an aluminum salt to be dosed by a dosing part is controlled in the range of 0.1 to 0.001 in terms of an ALT ratio on the basis of turbidity values as determined by the turbidity detecting part.

Moreover, an additional constitution may be provided in which when the turbidity of the treated water exceeds a predetermined turbidity level on the basis of turbidity values of the treated water as determined in the turbidity detecting part, the packing medium accumulation layer in the downstream coagulation and sedimentation part can be automatically washed.

EXPLANATION OF SYMBOLS

10 Conventional upward flow type coagulator
12 Untreated water tank
14 Raw water pump
16 Coagulant adding facilities
18 Coagulant mixing tank
20 Coagulation tank
22 Turbidimeter
24 Coagulant tank
26 Untreated water supply pipe
28 Coagulant pump
29 Stirrer
30 Inflow pipe
32 Untreated water inflow zone
34 Packing medium accumulation zone
36 Water collection zone
38, 40 Outflow prevention plates
42 Small packing media
44 Packing medium accumulation layer 46 Water collection part
48 Water collection trough
50 Outflow pipe
52 Treated water tank
54 Baffle plate
56 Alkaline agent injection pipe
58 Sludge storage zone
60 Sludge discharge pipe
62 Air supply pipe
64 Air blower
70 Coagulator in Exemplary Embodiment 1
72 Coagulation tank
74 Second packing medium accumulation zone
76 Water collection zone
78 First packing medium accumulation zone
79 Separation zone
80 Sludge storage zone
81 Container
82 First packing medium accumulation layer
84 Second packing medium accumulation layer
86 Cylinder part
88 Reverse cone part
90, 92 Outflow prevention plates
94 Waste pipe
100 Coagulation tank in Exemplary Embodiment 2
102 Second packing medium accumulation layer
104 First packing medium accumulation layer
106 Container
108 Sludge collecting machine with scraper
110 Sludge storage zone
112 Coagulation tank in Exemplary Embodiment 3
113, 114 Packing medium accumulation layer
115 Downstream coagulation tank
116, 117 Sludge storage zones
118 Packing medium accumulation layer
120 Coagulation tank in Exemplary Embodiment 4
122 First treatment tank
124 First packing medium accumulation layer
126 Coagulation tank
128, 130 Outflow prevention plates
132 Primary treated water pipe

BEST MODE FOR CARRYING OUT THE INVENTION

Exemplary embodiments will be described hereinbelow. Reference is made to the accompanying drawings to describe specifically and in more detail the embodiments of the present invention, which is not intended to be limited to those.

Exemplary Embodiment 1

Figure 1:
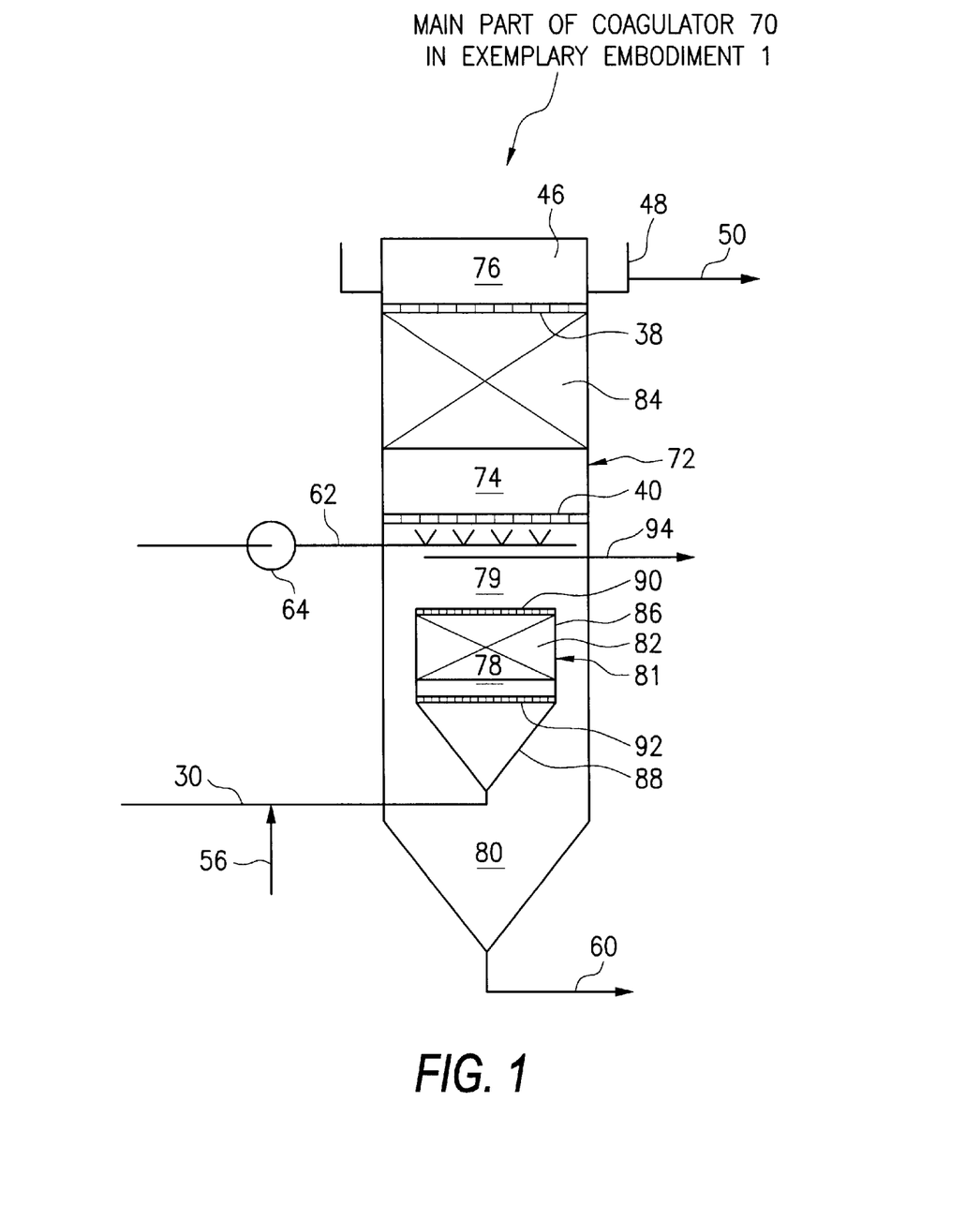
FIG. 1 is a schematic view showing the constitution of a coagulation tank in an exemplary Embodiment 1 of the present invention.

This exemplary embodiment is an example of the embodiment of a coagulator according to the present invention. FIG. 1 is a schematic view showing the constitution of a coagulation tank (a treatment tank) in a coagulator in accordance with this exemplary embodiment. In the schematic views of FIG. 1 and FIGS. 2 to 4, the same members as in FIGS. 5 to 7 are represented by the same symbols, and the description of these members is not repeated. Moreover, optional accessories such as an on-off valve and a meter are not described except where helpful to illustrate the present invention.

Except for constitution of a coagulation tank 72, a coagulator 70 in this exemplary embodiment has the same constitution as a conventional upward flow type coagulator 10 shown in FIG. 5.

As shown in FIG. 1, the coagulation tank 72 is equipped with a second packing medium accumulation zone 74 and a water collection zone 76 having the same constitutions as the packing medium accumulation zone 34 and water collection zone 36 of the conventional coagulation tank 20, and the coagulation tank 72 is also equipped with another first packing medium accumulation zone 78 under the second packing medium accumulation zone 74 and a sludge storage zone 80 under this zone 78. Between the first packing medium accumulation zone 78 and the second packing medium accumulation zone 74 is disposed a separation zone 79 comprising a simple space region (plenum chamber).

A first packing medium accumulation layer 82 formed in the first packing medium accumulation zone 78 functions as a packing medium accumulation layer in an upstream coagulation part, and a second packing medium accumulation layer 84 formed in the second packing medium accumulation zone 74 functions as a packing medium accumulation layer in a downstream coagulation and sedimentation part.

The first packing medium accumulation zone 78 is provided with a container 81, which is equipped with a cylinder part 86 on an upper side and a reverse cone part 88 adjacent to the cylinder part 86 on a lower side, and the cylinder part 86 accommodates many small packing media (hereinafter referred to simply as "the packing media"). With the passage of water, a first packing medium accumulation layer 82 is formed. In this connection, the container 81 is not limited to a cylindrical shape, and other shapes, such as rectangular, are also acceptable.

At the upper end part and the lower end part of the cylinder part 86, outflow prevention perforated plates 90, 92 are disposed to prevent the accommodated packing media from flowing out along with the water. The reverse cone part 88 is connected at its bottom to an inflow pipe 30, and is provided so as to uniformly disperse and feed the raw water to the cylinder part 86.

In this exemplary embodiment, setting is made so that a superficial velocity in the first packing medium accumulation layer 82 formed in the cylinder part 86 may be higher than that in the second packing medium accumulation layer 84. More specifically, the diameter of the cylinder part 86 is set smaller than:that of the coagulation tank 72. Furthermore, the packing media constituting the first packing medium accumulation layer 82 are, for example, short tubes shown in FIG. 7 or the like, and may preferably have the same shape as the packing media constituting the second packing medium accumulation layer 84 and a larger size than that of the second packing media though packing media of the same size are obviously also acceptable.

The packing media constituting the first and second packing medium accumulation layers are surrounded by outflow prevention plates 90, 92, 38, 40, and hence either of the floatable packing media and the sinkable packing media can be used irrespective of specific gravity. In addition, packing media which have a true specific gravity of about 1 and which lie on the outflow prevention plates 92, 40 before the passage of the raw water and float by the passage of the raw water or primary treated water at an upward flow of 150 m/d or more to form the packing medium accumulation layer under the upper outflow prevention plates 90, 38, can also be employed.

In the separation zone 79, a space is provided having the same diameter as the coagulation tank 72. This space acts to quickly slow the flow velocity of the primary treated water discharged from the first packing medium accumulation layer 82 so that coagulated coarse flocs in the primary treated water will hydrodynamically separate from the primary treated water.

A waste pipe 94 is disposed above the separation zone 79 and under the outflow prevention plate 40. This waste pipe 94 is a water collection pipe which may be a pipe having no upper half in the tank. Also, under the outflow prevention plate 40, an air supply pipe 62 equipped with many air nozzles for jetting air upwardly is disposed as in the case of a conventional coagulation tank 20, and air delivered by an air blower 64 is jetted to stir and wash the packing media of the second packing medium accumulation layer 84.

A sludge storage zone 80 comprises an annular region between the container 81 and a coagulation tank 72 which is located below the container 81, and it is constituted similarly to the conventional coagulation tank 20 shown in FIG. 6.

Next, reference will be made to a water treatment method by the coagulator 70 of this exemplary embodiment and the functions of the packing medium accumulation layers.

An aluminum-based inorganic coagulant is first added to the raw water fed to the coagulator 70 so that an ALT ratio may be in the range of 0.1 to 0.001. After rapid mixing in a coagulant mixing tank 18, the mixture is fed via the inflow pipe 30 to the reverse cone part 88 within the coagulation tank 72.

In the coagulant mixing tank 18 and the inflow pipe 30, suspended solids in the raw water form micro-flocs with diameters of 10 $\mu$m to several tens $\mu$m through a coagulating reaction.

Soon after the commencement of passage of the raw water, the micro-flocs in the water which flows into the first packing medium accumulation layer 82 formed in the container 81 are deposited on and begin to cover the surfaces of the packing media by the effect of "screening" of the packing media, thereby being captured thereon.

Once the micro-flocs begin to deposit on the surfaces of the packing media, subsequent micro-flocs continue to be deposited on the free surfaces of the packing media while, because the deposited micro-flocs themselves have a coagulating deposition force, micro-flocs which collide with micro-flocs already deposited on the surfaces of the packing media are captured by these micro-flocs. In this way, the contacts between micro-flocs accelerates, and a floc layer grows on the packing media.

Flocs are not readily dislodged at an early stage of the deposition because the deposition force of the micro-flocs onto the packing media is relatively strong, but when the subsequent micro-flocs are successively adsorbed and gradually coarsen, they are dislodged by the shearing force of the water. Meanwhile, micro-flocs which are dislodged before becoming sufficiently coarse and have grown past a certain size become deposited at positions in the first packing medium accumulation layer 82 where the flow of the raw water is slow, or on the back surfaces of the packing media or internal voids which are not affected by the water flow.

The ALT ratio of the coagulant added to the raw water can be as low as 0.1 to 0.001, as against an ALT ratio of 0.1 to 0.4 in a conventional coagulation method, hence the micro-flocs have a larger density and higher floc strength, and therefore have a high sedimentation velocity without breakage when being dislodged from the packing media.

As the capture of the suspended solids in the raw water progresses in this way, the various flocs, including the micro-flocs deposited on the surfaces of the packing media and the coagulated coarse flocs having high sedimentation velocities become contained in the first packing medium accumulation layer 82. As the deposition of the flocs progresses, the insides of the packing media and the spaces between the packing media are partially clogged, but the deposited floc group can be upwardly jetted by the pressure of the passing raw water flow.

The jet phenomenon of the floc group has the effect of classifying the thus-jetted flocs. That is to say, the rather fine floc particles are stirred up by the flow velocity of the raw water, but, when they contact the upper packing media, they are deposited there. On the other hand, the coagulated coarse flocs resist the flow and stay on the packing media in the vicinity of the position where the jetting of flocs has occurred.

As the deposition and the growth of the micro-flocs progress, the first packing medium accumulation layer 82 is filled with the coagulated coarse floc group, and the coagulated floc group leaves the first packing medium accumulation layer 82 along with the primary treated water and flows upwardly through the upper outflow prevention plate 90.

The primary treated water as discharged from the first packing medium accumulation layer 82 as a certain velocity but slows down greatly from the separation zone 79 until the second packing medium accumulation layer 84. In consequence, the coagulated flocs having large particle diameters and high densities are separated from the flow of the primary treated water, and most of the coagulated flocs settle during their passage through a space between the coagulation tank 72 and the container 81 which is in a still water state. The thus settled flocs reach the sludge storage zone 80, and are then stored as settled sludge.

In other words, the micro-flocs formed in the coagulant mixing tank 18 and the inflow pipe 30 are changed into the coagulated coarse flocs at a fairly high ratio, and these coagulated coarse flocs are settled and separated in the sludge storage zone 80. As a result, the amount of suspended solids in the primary treated water which flows into the second packing medium accumulation layer 84 on the downstream side can be largely reduced and most of the suspended solids themselves become micro-flocs.

Because the superficial velocity in the first packing medium accumulation layer 82 is accelerated, the coarse flocs coagulated in the first packing medium accumulation layer 82 are from time to time dislodged and entrained by the flow of the raw water without mechanically dislodging them.

Therefore, even if no specific wash operation is carried out, the floc coagulation adsorption activity of the first packing medium accumulation layer 82 can be maintained at a high level, and clogging of the first packing medium accumulation layer 82 can be prevented.

On the other hand, the amount of micro-flocs flowing into the second packing medium accumulation layer 84 is noticeably reduced, and therefore a packing medium having a smaller size than in a conventional case can be used as the packing medium for the second packing medium accumulation layer 84. When such packing medium having a smaller size is used, the turbidity of the treated water can be reduced without shortening the interval between washes.

The capture mechanism of the micro-flocs in the second packing medium accumulation layer 84 is the same as the capture mechanism in the first packing medium accumulation layer 82, while, the superficial velocity in the second packing medium accumulation layer 84 is slower than that in the first packing medium accumulation layer 82. Accordingly, the breakage and the classifying function of the coagulated floc group by the flow of the primary treated water is more moderate than in the first packing medium accumulation layer 82, and coagulated flocs particles of small diameters alone are carried upward.

As a result, soon after the commencement of the water passage, the amount of coagulated flocs rapidly increases around the packing media of the lowermost part into which the micro-flocs flow and, moreover, the capture of the flocs by the surface filtration of a coagulatory filtration treatment is reduced and clogging progresses only slowly. However, before the lowermost part of the packing medium accumulation layer has been completely clogged, the primary treated water flows intensively through positions where pressure loss is small, and, at these positions, the breakage and the classifying function occur. Therefore, a capture region of the micro-flocs expands from the lower part to the upper part of the second packing medium accumulation layer 84 with the lapse of the water passage time of the primary treated water.

Therefore, even when the second packing medium accumulation layer 84 is filled with coagulated flocs, the increase of loss-of-head in the second packing medium accumulation layer 84 is mild, because the packing medium have a large surface area and void volume.

In addition, because the floc load of the second packing medium accumulation layer 84 is small, the interval between the cleaning treatments can be prolonged.

As described above, the mechanism of the capture of the coagulated flocs in the second packing medium accumulation layer 84 is carried out by the surface filtration at an early stage of the passage of the primary treated water, and in succession, the capture of the coagulated flocs is continued under the breakage and the classifying function by deposit filtration. As a result, the subsequent coagulated flocs pass through the densely existing coagulated floc group, and hence, they are securely adsorbed by the coagulated floc group with the aid of its strong adsorptive function.

Accordingly, even if the turbidity of the raw water rapidly increases, the coarse flocs or the micro-flocs do not flow at one time from the second packing medium accumulation layer 84, and treated water having a low turbidity can be reliably obtained between the start of flow of the raw water and the step in which the wash operation is required.

As described above, in the first packing medium accumulation layer 82, the superficial velocity is high, and hence, the primary treated water including the coarse flocs flows out, to thereby permit a long-term water passage treatment requiring almost no cleaning of the packing media.

On the other hand, in the second packing medium accumulation layer 84, the superficial velocity is lower than in the first packing medium accumulation layer 82, and, while the dislodgment and settlement of the coagulated floc particles are widely carried out, most micro-flocs which flow thereinto pass at such speed as to be captured in the second packing medium accumulation layer 84. In consequence, it is necessary to periodically clean the packing media. The flocs which have been captured in the second packing medium accumulation layer 84 and have grown to the coagulated flocs differ from the viscous flocs formed by a conventional excessive addition of the coagulant and can be easily dislodged from the packing media. Thus, by stopping the passage of the primary treated water, discharging the water through the waste pipe 94, and allowing the stored water in the second packing medium accumulation layer 84 to flow downward, the deposited flocs can be simply dislodged from the packing media, entrained, and removed, whereby the clogging of the packing medium accumulation layer can be eliminated and the deposition activity of the packing media can be recovered.

As in the conventional case, the raw water passage may be stopped, and the air blower 64 may be started to deliver compressed air through the air supply pipe 62 to the second packing medium accumulation layer 84, thereby stirring and wash the packing media. Next, the water may be discharged through the waste pipe 94.

The settled sludge stored in the sludge storage zone 80 is discharged through a sludge discharge pipe 60. In this exemplary embodiment, the settled sludge can be coagulated by injecting a small amount of coagulant, and hence the condensation properties of the settled sludge are good and the settled sludge can be concentrated to a high concentration of 5 to 15% in a tank. The concentrated sludge obtained in this way has excellent dewaterability, and the capacity of a dehydrating device can be minimized. In addition, the cake moisture content is low, which can reduce disposal costs.

In this exemplary embodiment, the sludge can be thickened to a high concentration of 5 to 15% in a tank, and, for this reason, there is no water loss by frequently drawing sludge which is merely concentrated to a low concentration of about 1 to 2% in the tank, as in a conventional high-speed coagulation tank not having any packing medium layer.

The above-mentioned advantages and effects of the coagulator 70 of this exemplary embodiment can be achieved by the four features of (1) injecting the necessary and minimum amount of the inorganic coagulant into the raw water introduced into the coagulator, (2) disposing, as a pretreatment part, the first packing medium accumulation layer 82 in which a plurality of packing media having the large surface area and void volume are accumulated, (3) disposing the separation zone 79 to settle and separate the coagulated coarse flocs which flow from the first packing medium accumulation layer 82, and (4) establishing such a constitution that the second packing medium accumulation layer 84 alone may be washed.

Exemplary Embodiment 2

Figure 2:
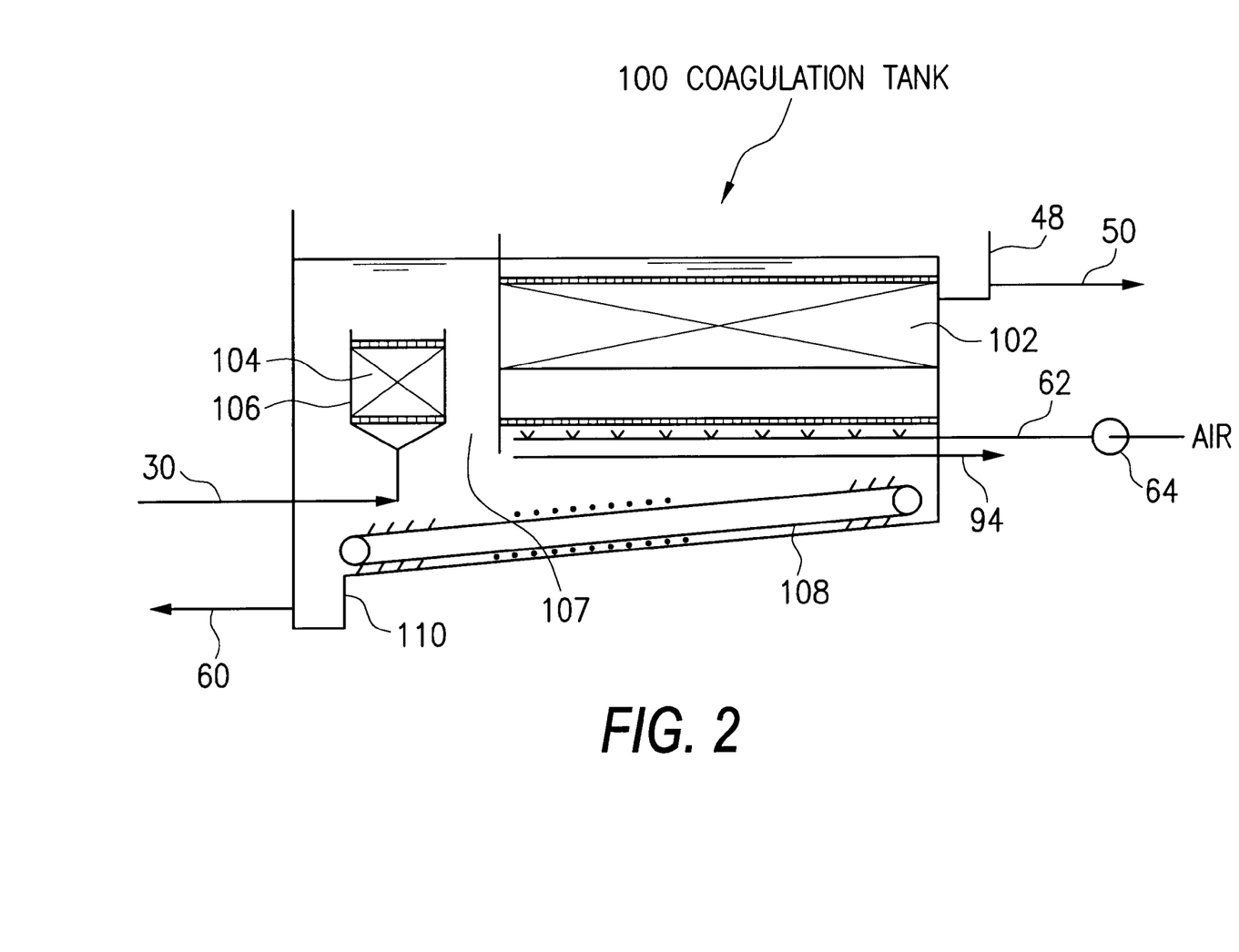
FIG. 2 is a schematic view showing the constitution of a coagulation tank in an exemplary Embodiment 2.

This exemplary embodiment is a modified example of Exemplary Embodiment 1, and FIG. 2 is a schematic view showing the constitution of a coagulation tank in Exemplary Embodiment 2.

A coagulation tank 100 in Exemplary Embodiment 2 is equipped with a second packing medium accumulation layer 102 as shown in FIG. 2 and, on one side of this second packing medium accumulation layer 102, a container 106 is disposed which forms a first packing medium accumulation layer 104 having a smaller sectional area as compared with the sectional area of the second packing medium accumulation layer 102.

The first packing medium accumulation layer 104 and the second packing medium accumulation layer 102 in this exemplary embodiment perform the same functions as the first packing medium accumulation layer 82 and the second packing medium accumulation layer 84 in Exemplary Embodiment 1 respectively, while a tank inner region 107 in the coagulation tank 100 ranging from the first packing medium accumulation layer 82 to the second packing medium accumulation layer 84 functions as a separation zone.

In this exemplary embodiment, a sludge collecting machine with scraper 108 is disposed on the bottom of the coagulation tank 100, and the settled coagulated flocs are collected from the tank inner region 107 and the second packing medium accumulation layer 102 to a sludge storage zone by the sludge collecting machine 108 and they are then discharged.

Exemplary Embodiment 3

Figure 3:
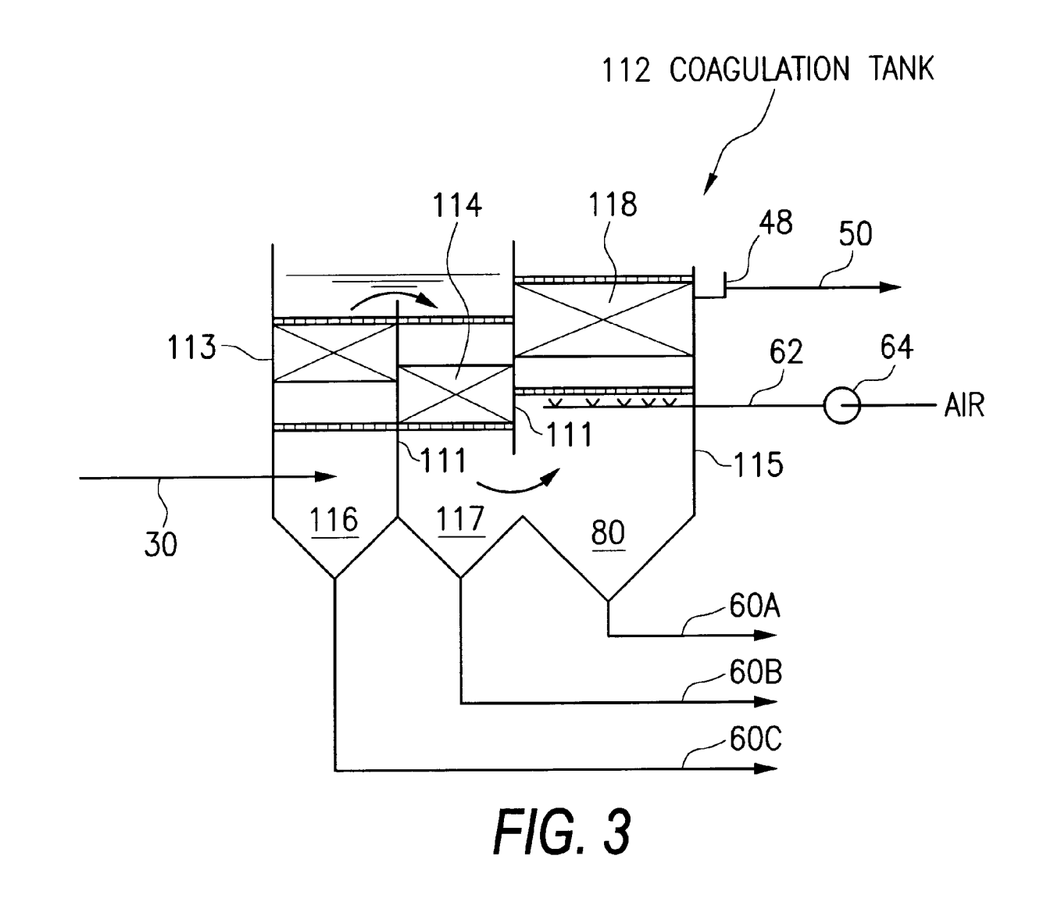
FIG. 3 is a schematic view showing the constitution of a coagulation tank in an exemplary Embodiment 3.

This exemplary embodiment is a modified example of Exemplary Embodiment 1, and FIG. 3 is a schematic view showing the main part of a coagulator, i.e., the constitution of a coagulation tank in Exemplary Embodiment 3.

As shown in FIG. 3, a coagulation tank 112 of Exemplary Embodiment 3 is equipped with two-layer packing medium accumulation layers 113, 114 as upstream coagulation parts having the same constitution as the conventional coagulation tank 20 and a downstream coagulation tank 115 as a downstream coagulation part in sections divided by partitions in one treatment tank, and the packing medium accumulation layers 113, 114 are formed so that each of their sectional areas may be smaller than that of a packing medium accumulation layer 118 in the downstream coagulation tank 115.

In this exemplary embodiment, raw water flows upward through the packing medium accumulation layer 113 and then flows down through the packing medium accumulation layer 114 and then upward through the downstream coagulation tank 115. In the coagulation tank 112, a raw water inflow pipe 30 is connected to a lower position of the packing medium accumulation layer 113. In addition, the downstream coagulation tank 115 is provided at a lower part thereof with the sludge storage zone 80 having the sludge discharge pipe 60A, and the packing medium accumulation layers 113, 114 are also provided at lower parts thereof with sludge storage zones 116, 117 having sludge discharge pipes 60B, 60C, respectively.

In this connection, although not shown, the packing medium accumulation layers 113, 114 which are disposed as upstream coagulation parts may be provided at lower parts thereof with air feed pipes for washing the packing medium accumulation layers.

Exemplary Embodiment 4

Figure 4:
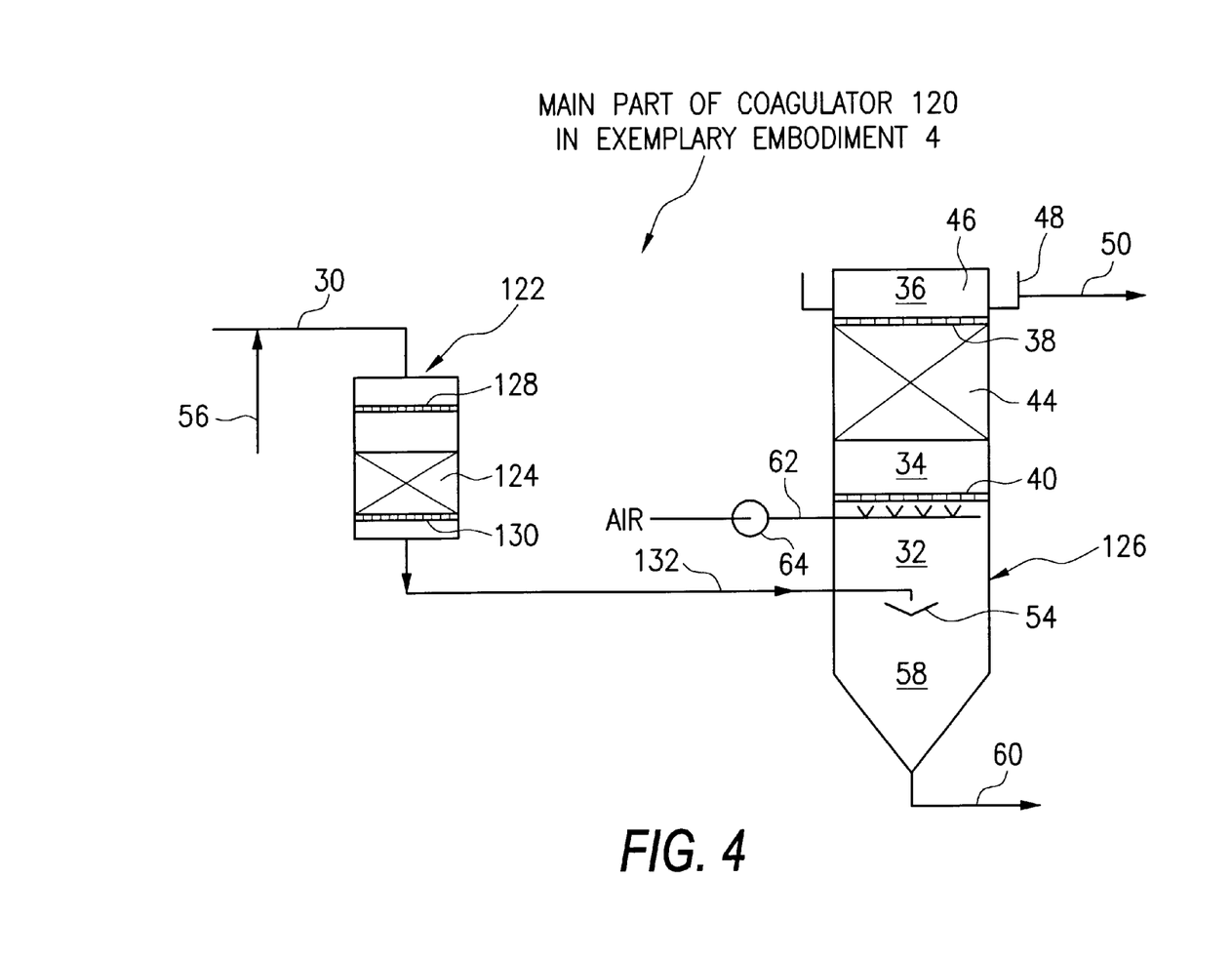
FIG. 4 is a schematic view showing the constitution of a coagulation tank in an exemplary Embodiment 4.

This exemplary embodiment is another example of a coagulator in accordance with the present invention. FIG. 4 is a flow sheet showing the main part of the coagulator, i.e., the constitution of a coagulation tank.

As shown in FIG. 4, a coagulation tank 120 of this exemplary embodiment is equipped with a first packing medium accumulation layer 124 as an upstream coagulation part formed in a first treatment tank 122, and a coagulation tank 126 having the same constitution as the conventional coagulation tank 20 which is formed as a different tank than the first treatment tank 122. The first packing medium accumulation layer 124 is formed so that its sectional areas may be smaller than that of a packing medium accumulation layer 44 in the downstream coagulation tank 126.

The first treatment tank 122 is a vertical type cylindrical tank, and this cylindrical tank is provided at an upper part and a lower part thereof with outflow prevention plates 128, and 130, respectively. A packing media is charged between these outflow prevention plates to form the first packing medium accumulation layer 124 with the introduction of the raw water.

The raw water flows through the first packing medium accumulation layer 124 in the manner of a downward flow. Micro-flocs in the raw water are coagulated by the same coagulation function as in the first packing medium accumulation layer 82 in Exemplary Embodiment 1, and the thus coagulated flocs flow together with a primary treated water through a primary treated water pipe 132 to the downstream coagulation tank 126.

Alternatively, as in Exemplary Embodiment 1, the constitution may be made so that the raw water may flow through the first packing medium accumulation layer 124 in the manner of an upward flow.

Exemplary Embodiment 5

This exemplary embodiment is a modified example of Exemplary Embodiment 4. In this embodiment, there are provided a first treatment tank 122 and a plurality of coagulation tanks 126 arranged in parallel on the downstream side of the first treatment tank 122.

In this embodiment, one or more of the coagulation tanks 126 can be kept in a water passage state while the other coagulation tanks 126 are washed, to thereby maintain uninterrupted flow of raw water and continuous discharge of the treated water.

Test Example of the Coagulator of Exemplary Embodiment

In order to evaluate the performance of the coagulator in accordance with the present invention, an experimental tank having the same constitution as the coagulation tank 72 of Exemplary Embodiment 1 was prepared with the following specifications.
(1) Experimental tank
  Dimensions: diameter×height=400 mm×3500 mm
(2) First packing medium accumulation layer
  Dimensions of cylindrical part: diameter×height=300 mm×500 mm
  Packing medium accumulation layer: Height=500 mm
  Packing medium: Short tubes
    Inner diameter×length=10 mm×10 mm
    Specific gravity=0.98
(3) Second packing medium accumulation layer
  Packing medium accumulation layer: Height=1000 mm
  Packing medium: Short tubes
    Inner diameter×length=4 mm×4 mm
    Specific gravity=0.98

River surface water having a low turbidity of about 15 degrees was used as the raw water, and polyaluminum chloride was added to the raw water at an ALT ratio of 0.007, thereby preparing a test raw water having a low turbidity. In addition to the test raw water, other test raw water having a high turbidity was prepared by adding kaolin as a turbid material to the same river water to artificially obtain a high-turbidity kaolin raw water of about 500 degrees, and further adding polyaluminum chloride thereto for an ALT ratio of 0.05.

A turbidity removal test was carried out by passing the two batches of test raw water through the experimental tank at a superficial velocity through the second packing medium accumulation layer (LV) of 400 m/d (therefore, a superficial velocity through the first packing medium accumulation layer=710 m/d). Table 1 shows the measured results of turbidities of the treated waters obtained in the turbidity removal tests, turbidity removal ratios, properties of sludges drawn from a sludge storage zone, and the like.

TABLE 1

|  | River Water | Kaolin Raw Water |
| --- | --- | --- |
| Turbidity of raw water (degree) | 15 | 500 |
| Turbidity of treated water (degree) | 0.4 | 1.2 |
| Operation continuous time (hr) | 17 | 6 |
| Water recovery ratio (%) | 99.6 | 98.5 |
| Solid concentration of drawn sludge (%) | 3.3 | 8.5 |

Test Example of a Conventional Coagulator

An experimental tank having the same constitution as in a coagulation tank 20 of a conventional coagulator 10 was also prepared with the following specifications.

(1) Experimental tank
   Dimensions: diameter×height=400 mm×3500 mm
(2) Packing medium accumulation layer: Height=1000 mm
   Packing medium: Short tubes
      Inner diameter×length=4 mm×4 mm
      Specific gravity=0.98

Next, a turbidity removal test was carried out as in the test example of the coagulator Exemplary Embodiment 1, and Table 2 shows the measured results of turbidities of the treated waters obtained in the turbidity removal tests, turbidity removal ratios, properties of sludges drawn from a sludge storage zone, and the like.

TABLE 2

|  | River Water | Kaolin Raw Water |
|---|---|---|
| Turbidity of raw water (degree) | 15 | 500 |
| Turbidity of treated water (degree) | 1.2 | 3.5 |
| Continuous operation time (hr) | 12 | 4.5 |
| Water recovery ratio (%) | 98.5 | 96.0 |
| Solid concentration of drawn sludge (%) | 2.4 | 6.2 |

As is apparent from Tables 1 and 2, in Exemplary Embodiment 1, treated water having a low turbidity of 0.4 degree could be obtained from the low-turbidity water having a turbidity of about 15 degrees at an extremely low coagulant addition ratio of an ALT ratio=0.007 and at a superficial velocity of LV=400 m/d, and the turbidity of the raw water could be removed at a removal ratio of about 97% or more. In addition, the drawn sludge having excellent dewaterability could be obtained at a relatively high solid concentration of about 3.3%.

Moreover, also in the case of the artificially prepared high-turbidity water, the turbidity of the raw water could be removed at a removal ratio of about 99% or more. In addition, the drawn sludge having excellent dewaterability could be obtained at a high solid concentration of about 8.5%.

On the other hand, in the conventional coagulation tank, the continuous operation time was shorter and the turbidity of the treated water was much higher, as compared with Exemplary Embodiment 1.

In the description above, the embodiment in which the present invention was applied to the water purifying treatment for obtaining city water or industrial water has been mainly discussed, but in addition to the water purifying treatment, the present invention can be applied to the treatment of sewage, effluent and the like. Also, with regard to the coagulant to be used, in addition to aluminum-based coagulants, for example, a iron-based inorganic coagulants can also be used. In this case, an FeT ratio (an injection amount ratio of iron ion to a raw water turbidity) or an FeSS ratio (an injection amount ratio of iron ion to a raw water turbid material concentration) is used in place of the above-mentioned ALT ratio to regulate the size of flocs.

As understood from the foregoing, according to the present invention, an upstream coagulation part having at least one packing medium accumulation layer through which raw water is passed at a superficial velocity higher than a superficial velocity in the packing medium accumulation layer of a coagulation and sedimentation part is disposed as a pretreatment part between a coagulation and sedimentation part and an addition part of a conventional coagulator, and primary treated water is allowed to flow together with coarse flocs coagulated in the packing medium accumulation layer of the upstream coagulation part from the upstream coagulation and sedimentation part to a downstream coagulation and sedimentation part, whereby a water passage time between a washing operation and the next washing operation of the packing medium accumulation layer in the downstream coagulation settlement part can be more prolonged as compared with the conventional coagulator, and the treated water having a low turbidity can be obtained.

POSSIBILITY OF INDUSTRIAL UTILIZATION

A coagulator of the present invention can be used where raw water such as river water is treated to obtain city water or industrial water and where effluents such as public sewage and industrial waste water are treated to a standard level.

What is claimed is:

1. A coagulator that receives water bearing suspended solids and a coagulant and that coagulates the suspended solids, the coagulator including:
   a coagulation and sedimentation part that includes:
      a second packing medium accumulation layer comprising accumulated packing media having a void volume; and
      a sludge accumulation zone positioned below the second packing medium accumulation layer and configured to receive solids that coagulate from the water and having a sludge removal opening by which the received coagulated solids may be discharged;
      wherein the water bearing the coagulant is allowed to flow in the manner of an upward flow through the second packing medium accumulation layer to coagulate and settle the suspended solids from the water in the sludge accumulation zone; and
   an upstream coagulation part including at least one first packing medium accumulation layer comprising packing media having a void volume, the upstream coagulation part being disposed between the second packing medium accumulation layer and the sludge accumulation zone of the coagulation and sedimentation part;
   wherein the coagulator is configured to pass the water bearing the coagulant through the first packing medium accumulation layer prior to passing the water through the second packing medium accumulation layer, and
   the sludge removal opening is positioned to receive solids from the coagulation and sedimentation part and the upstream coagulation part.

2. The coagulator according to claim 1 wherein
   at least one of the shape or size of the packing media comprising the first packing medium accumulation layer is different from that of the packing media comprising the second packing medium accumulation layer.

3. The coagulator according to claim 2 wherein
   the shape of the packing media comprising the second packing medium accumulation layer is the same as that of the packing media comprising the first packing medium accumulation layer, and the size of the packing media comprising the second packing medium accumulation layer is smaller than that of the packing media comprising the first packing medium accumulation layer.

4. The coagulator according to claim 3 wherein
   the first packing medium accumulation layer and the second packing medium accumulation layer are disposed from a lower part to an upper part in turn in one treatment tank, and the water flows in the manner of an upward flow.

5. The coagulator according to claim 3 wherein the first packing medium accumulation layer and the second packing medium accumulation layer are disposed in parallel in one treatment tank; the water flows through the first packing medium accumulation layer in the manner of an upward or a downward flow; and the water flows through the second packing medium accumulation layer in the manner of an upward flow.

6. The coagulator according to claim 3 wherein the first packing medium accumulation layer and the second packing medium accumulation layer are disposed in different treatment tanks and wherein the water flows through the first packing medium accumulation layer in the manner of an upward or a downward flow.

7. The coagulator according to claim 2 wherein the first packing medium accumulation layer and the second packing medium accumulation layer are disposed from a lower part to an upper part, in turn, in one treatment tank, and the water flows in the manner of an upward flow.

8. The coagulator according to claim 2 wherein the first packing medium accumulation layer and the second packing medium accumulation layer are disposed in parallel in one treatment tank; the water flows through the first packing medium accumulation layer in the manner of an upward or a downward flow; and the water flows through the second packing medium accumulation layer in the manner of an upward flow.

9. The coagulator according to claim 2 wherein the first packing medium accumulation layer and the second packing medium accumulation layer are disposed in different treatment tanks and wherein the water flows through the first packing medium accumulation layer in the manner of an upward or a downward flow.

10. The coagulator according to claim 1 wherein the first packing medium accumulation layer and the second packing medium accumulation layer are disposed from a lower part to an upper part, in turn, in one treatment tank, and the water flows in the manner of an upward flow.

11. The coagulator according to claim 1 wherein the first packing medium accumulation layer and the second packing medium accumulation layer are disposed in parallel in one treatment tank; the water flowing through the first packing medium accumulation layer of the upstream coagulation part in the manner of an upward or a downward flow; and the water flowing through the second packing medium accumulation layer in the manner of an upward flow.

12. The coagulator of claim 1 wherein the first packing medium accumulation layer and the second packing medium accumulation layer are disposed in different treatment tanks and wherein the water flows through the first packing medium accumulation layer in the manner of an upward or a downward flow.

13. The coagulator according to claim 1 wherein the packing media of the first packing medium accumulation layer are larger than at least one packing media of the second packing medium accumulation layer.

14. The coagulator according to claim 1 wherein the first packing medium accumulation layer is configured to pass the water at a superficial velocity that is approximately twice as fast as the superficial velocity at which the water passes through the second packing medium accumulation layer.

15. The coagulator according to claim 1 wherein the second packing medium accumulation layer is configured to pass water at a superficial velocity of between about 150 to about 800 meters per day.

16. The coagulator according to claim 1 wherein the first packing medium accumulation layer is configured to have a sectional area that is less than a sectional area of the second packing medium accumulation layer; and a separation zone lies between the first packing medium accumulation layer and the second packing medium accumulation layer, and the separation zone has a sectional area that is substantially larger than the sectional area of the first packing medium accumulation layer;

whereby the first packing medium accumulation layer passes the water at a superficial velocity higher than a superficial velocity at which the water is passed through the second packing medium accumulation layer.

17. The coagulator according to claim 16 wherein the coagulator includes a coagulator tank that holds the upstream coagulation part and the coagulation and sedimentation part, and a diameter of the first packing medium accumulation layer is less than a diameter of the coagulator tank while a diameter of the second packing medium accumulation layer is equal to the diameter of the coagulator tank.

18. The coagulator according to claim 1 wherein the packing media have void volumes that provide the packing media with void ratios of about 60% or more and the void volumes are configured to function as water passages.

19. The coagulator according to claim 18 wherein the packing media comprise open ended tubes.

20. A coagulator that receives water bearing suspended solids and a coagulant and that coagulates the suspended solids, the coagulator including:

a coagulation and sedimentation part that includes:

a second packing medium accumulation layer comprising accumulated packing media having a void volume; and a sludge accumulation zone positioned below the second packing medium accumulation layer and configured to receive solids that coagulate from the water and having a sludge removal opening by which the received coagulated solids may be discharged;

wherein the water bearing the coagulant is allowed to flow in the manner of an upward flow through the second packing medium accumulation layer to coagulate and settle the suspended solids from the water in the sludge accumulation zone; and an upstream coagulation part including at least one first packing medium accumulation layer comprising packing media having a void volume and through which raw water bearing a coagulant is passed at a superficial velocity higher than a superficial velocity in the second packing medium accumulation layer, the upstream coagulation part being disposed outside of the coagulation and sedimentation part;

wherein the coagulator is configured to pass the water bearing the coagulant through the first packing medium accumulation layer prior to passing the water through the second packing medium accumulation layer, and the sludge removal opening is positioned to receive solids from the coagulation and sedimentation part and the upstream coagulation part.

21. The coagulator according to claim 20 wherein the second packing medium accumulation layer is configured to pass the water at a superficial velocity of between about 150 to about 800 meters per day.

22. The coagulator according to claim 20 wherein the first packing medium accumulation layer is configured to pass the water at a superficial velocity that is approximately twice as fast as the superficial velocity at which the water passes through the second packing medium accumulation layer.

23. The coagulator according to claim 20 wherein the packing media of the first packing medium accumulation layer is larger than at least one packing media of the second packing medium accumulation layer.

24. The coagulator according to claim 20 wherein the packing media have void volumes that provide the packing media with void ratios of about 60% or more and the void volumes are configured to function as water passages.

25. The coagulator according to claim 24 wherein the packing media comprise open ended tubes.

* * * * *